(12) United States Patent
Medlar

(10) Patent No.: US 7,488,024 B1
(45) Date of Patent: Feb. 10, 2009

(54) CARGO STORAGE LINER ASSEMBLY FOR AN AUTOMOTIVE VEHICLE

(75) Inventor: Troy Medlar, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 12/125,551

(22) Filed: May 22, 2008

(51) Int. Cl.
*B60N 3/12* (2006.01)

(52) U.S. Cl. .................. 296/37.14; 296/37.16; 296/37.3

(58) Field of Classification Search .............. 296/37.16, 296/37.14, 37.3, 37.1, 37.8
See application file for complete search history.

(56) References Cited

U.S. PATENT DOCUMENTS

| 2002/0070574 A1* | 6/2002 | Carlsson et al. | .......... 296/37.14 |
| 2003/0116989 A1* | 6/2003 | Guanzon et al. | .......... 296/37.16 |

\* cited by examiner

*Primary Examiner*—Joseph D Pape
(74) *Attorney, Agent, or Firm*—Rankin, Hill & Clark LLP; Mark E. Duell

(57) ABSTRACT

A cargo liner storage assembly for an automotive vehicle is provided and includes a storage bin, a cargo lid assembly, and a cargo net assembly. The cargo lid assembly is rotatably and removably attached to the storage bin and includes multiple hinges and a latching assembly. The cargo net assembly is removably attached to the cargo lid assembly and includes a cargo net and a cargo net mounting assembly.

10 Claims, 4 Drawing Sheets

CARGO STORAGE LINER ASSEMBLY FOR AN AUTOMOTIVE VEHICLE

BACKGROUND OF THE INVENTION

1. Field of the Invention

The present invention relates to a storage area for an automotive vehicle. More specifically, the present invention relates to a cargo liner assembly for an automotive vehicle.

2. Description of Related Art

In a vehicle having a conventional cargo liner assembly there is limited storage area behind a rear seat of the vehicle when the rear seat is in an upright position. Specifically, there is limited floor space behind the rear seat to place items without the more fragile becoming damaged. For example, in the event that a person has multiple items whereby some of the items are fragile, such as glass items or food items like eggs, bread, etc., and the other items are heavier non-breakable type items it is difficult to store and secure the items behind the rear seat without the heavier items shifting and damaging the fragile items during operation of the vehicle.

Further, It is also desirable to have easy access to items behind the rear seat without stopping the vehicle. For example, during a long trip it would be desirable for a passenger sitting in the rear seat to simply reach over the rear seat while remaining in a seated position to reach items such as snacks, drinks, etc. without having to stop the vehicle, thereby prolonging the duration of the trip.

Thus, what is required is a cargo storage liner assembly that would overcome the above mentioned disadvantages and provide additional storage area behind the rear seat that is easily accessible from the rear seat while in a seated position.

SUMMARY OF THE INVENTION

In accordance with one aspect, the present invention overcomes the above mentioned disadvantages by providing a cargo liner storage assembly for an automotive vehicle that includes a storage bin having a rear wall and hinge supports linearly spaced across a top of the rear wall, a cargo lid assembly having a cargo lid comprised of an upper portion and a lower portion, and multiple hinges linearly spaced across a rear perimeter of the lower portion, and a cargo net assembly removably attached to a bottom surface of the lower portion of the cargo lid, wherein the linear spacing of the hinge supports correspond with the linear spacing of the hinges, wherein the hinges include a receiving portion to receive the hinge supports by snapping the multiple hinges over the multiple hinge supports to thereby attach the cargo lid to the storage bin, and wherein the cargo lid assembly can be removed from the storage bin by unsnapping the multiple hinges from the multiple hinge supports.

In accordance with another aspect, the present invention provides a cargo liner storage assembly for an automotive vehicle that includes a storage bin, a cargo lid assembly having a cargo lid comprised of an upper portion and a lower portion, the cargo lid being rotatably attached to the storage bin, and a cargo net assembly having a cargo net and a cargo net mounting assembly, wherein the cargo net mounting assembly is removably attached to a bottom surface of the lower portion and the cargo net is removably attached to the cargo net mounting assembly, wherein the cargo net includes a pair of side latching loops and a pair of storage fasteners located on a bottom surface of the cargo net near the side latching loops, wherein when the cargo net is in a useable position the side latching loops are attached to side wall hooks located on each side wall of the vehicle and the cargo net is generally parallel with a floor of the storage bin, and wherein when the cargo net is in a stored position the storage fasteners are attached to corresponding storage fasteners attached to a bottom surface of the lower portion of the cargo lid and the cargo net is generally parallel to the cargo lid.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
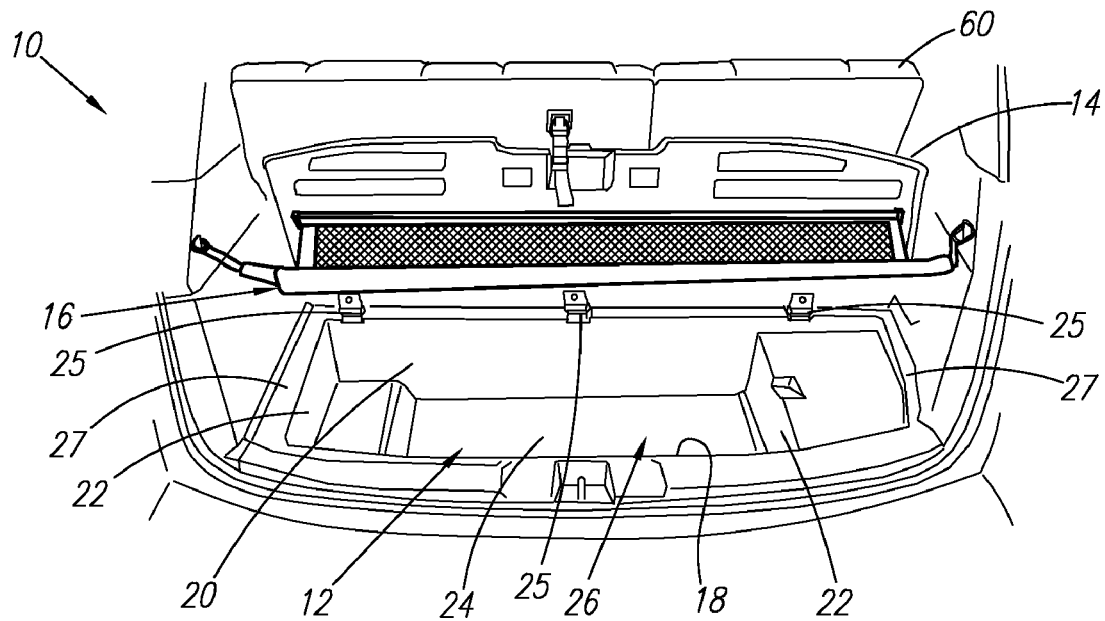
FIG. 1 is a view of a cargo storage liner assembly showing a cargo lid in an open position with a cargo net in a useable position.
Figure 2:
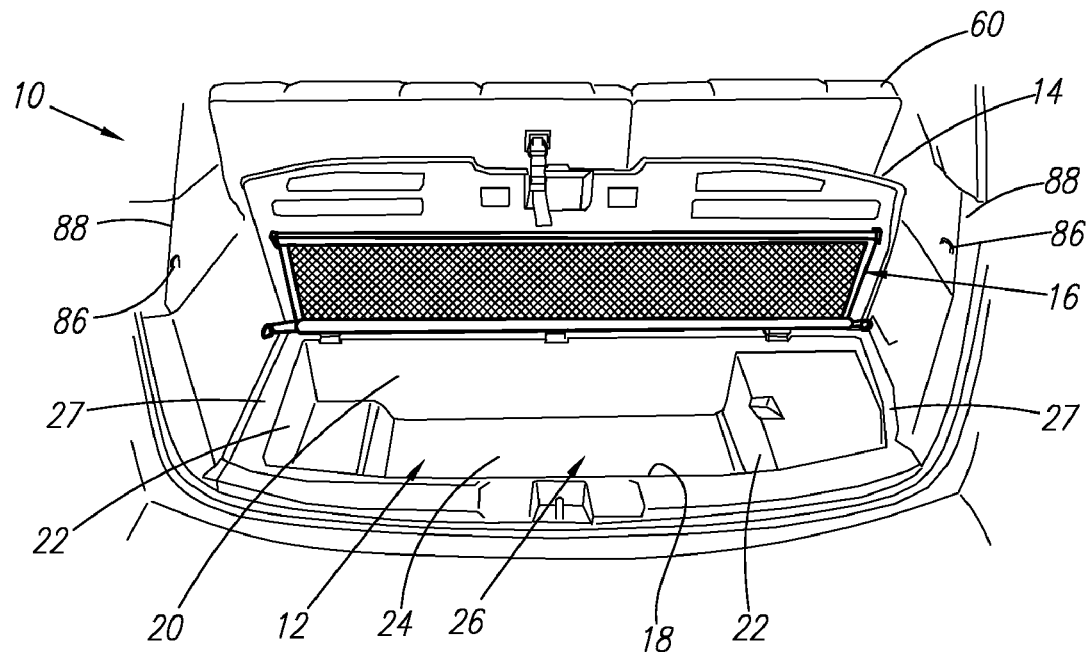
FIG. 2 is a view of the cargo storage liner assembly showing the cargo lid in the open position with the cargo net in a store position.

Referring now to the drawings, FIGS. 1 and 2 show perspective views of a cargo storage liner assembly 10 for an automotive vehicle in accordance with the present invention. The cargo storage liner assembly 10 includes a cargo storage bin 12 (hereinafter "bin"), a rotating-removable cargo lid assembly 14 (hereinafter "lid assembly"), and a cargo net assembly 16 (hereinafter "net assembly").

The bin 12 is the type commonly known in the art and, thus, will only be explained briefly. Further, the bin 12 is made from a material of the type commonly known in the art, such as but not limited to, a polymer, plastic, etc. The bin 12 includes a front wall 18, a rear wall 20, two side walls 22 and a floor 24. The front wall 18, rear wall 20, two side walls 22 and floor 24 define a bowl or storage section 26 for the storage of articles. A lip 27 is formed around a top perimeter of the bowl section 26 to provide a firm resting place for the lid assembly 14 when the lid assembly 14 is in a closed position. The bin 12 further includes multiple hinge supports 25 linearly spaced across the top of the rear wall 20 in generally the same plane as the lip 27. The hinge supports 25 have a circular cross section and are provided to allow easy removal/installation of the lid assembly 14, as will be explained further below.

Figure 4:
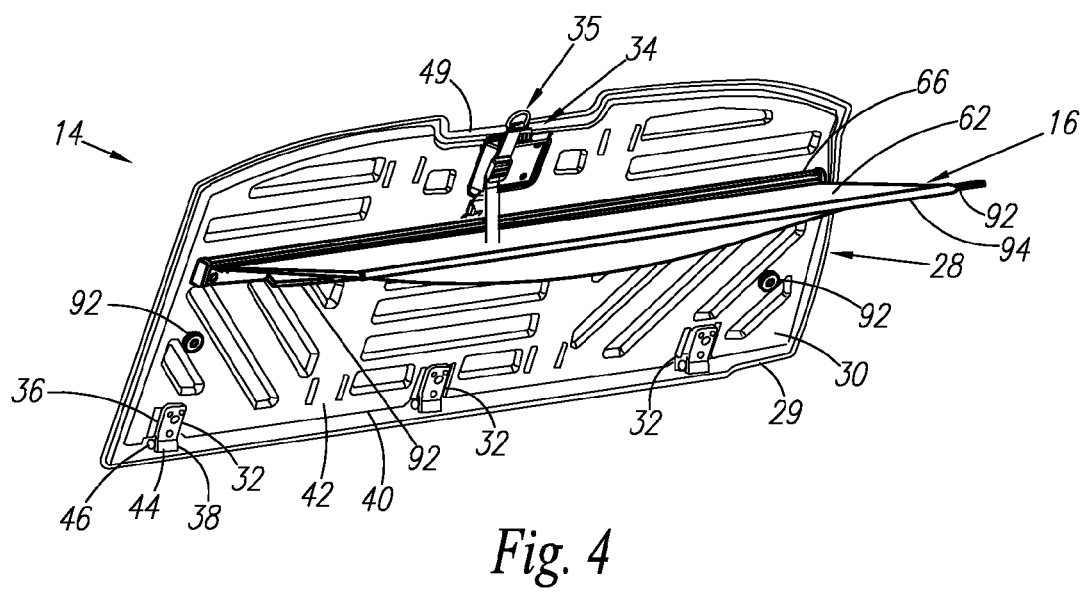
FIG. 4 is a perspective view of a cargo lid assembly in a detached state.

Referring to FIGS. 1, 2, and 4, the lid assembly 14 includes a cargo lid 28 having an upper portion 29 and a lower portion 30, multiple hinges 32, a latching mechanism 34, and a latching assembly 35. As shown in FIG. 4, the cargo lid 28 is formed by attaching a top surface of the lower portion 30 to a bottom surface of the upper portion 29 by a mechanical means commonly known in the art. Both the upper 29 and lower 30 portions are made from a material commonly known in the art such as but not limited to natural fiber, polypropylene, plastic, etc.

Figure 3:
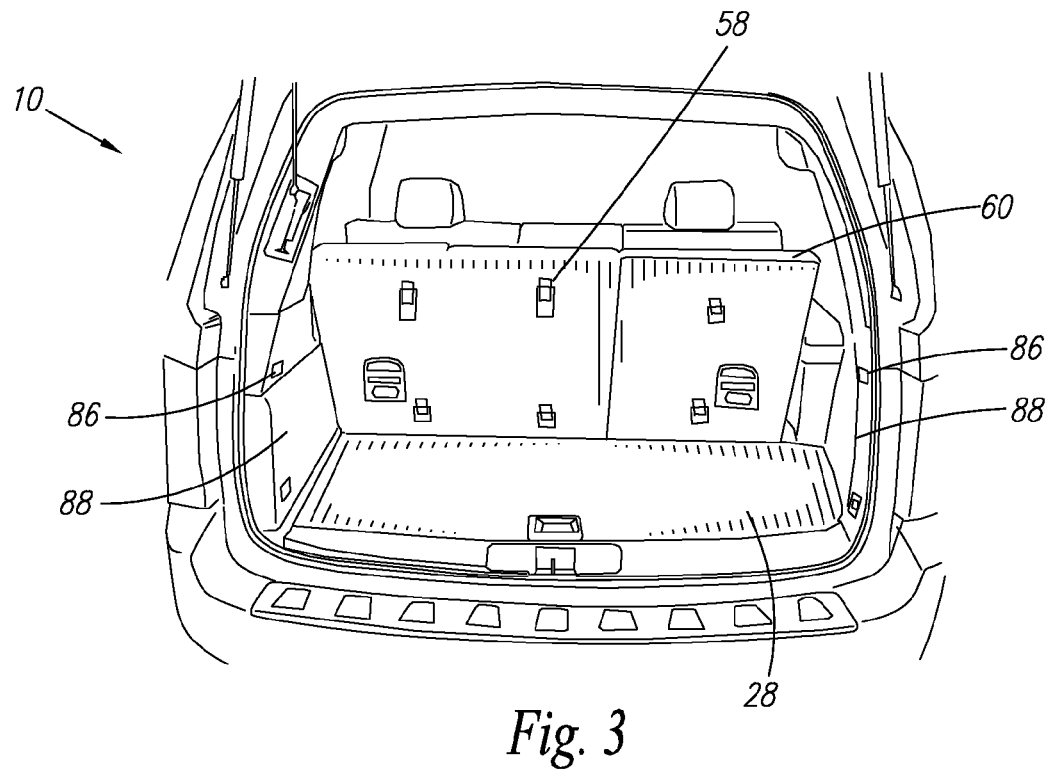
FIG. 3 is a view of the cargo storage liner assembly showing the cargo lid in a closed position.

Referring to FIG. 4, the multiple hinges 32 include a connecting portion 36 and a receiving portion 38. The connecting portion 36 includes multiple openings whereby mechanical fasteners, such as screws, rivets, etc. are inserted through the multiple openings to thereby attach the hinge 32 to a rear perimeter 40 of a bottom surface 42 of the lower portion 30, thereby securing the hinge 32 to the cargo lid 28. The multiple hinges 32 are spaced at intervals that correspond with the spacing of the multiple hinge supports 25 such that the multiple hinges 32 and the multiple hinge supports 25 are aligned with each other. The receiving portion 38 is integrated to the connecting portion 36 and includes a first arc-shaped arm 44 and a second arc-shaped arm 46. The arc-shaped arms 44, 46 extend away from the connecting portion 36 in an arc-like manner such that a circular opening is defined between the arc-shaped arms 44, 46. The arc-shaped arms 44, 46, however, do not form a complete circle. Rather, an elongated opening is defined between the end portions of the arc-shaped arms 44, 46. To install the lid assembly 14 onto the bin 12 the receiving portion 38 of each hinge 32 is simply snapped onto the corresponding hinge support 25 such that the hinge support 25 resides in the circular opening defined between the arc-shaped arms 44, 46. Thus, the lid assembly 14 is a removable assembly that can be easily removed and re-installed or replaced, by simply snapping and unsnapping the hinges 32 from the hinge supports 25. In addition, not only is the lid assembly 14 removable, the lid assembly 14 also pivots about an axis defined by the horizontal alignment of the multiple hinge supports 25. Thus, the cargo lid 28 can be rotated from an open position, as shown in FIGS. 1 and 2 to a closed position, as shown in FIG. 3, whereby the cargo lid 28 serves as a cover for the bin 12 and as a floor for the rear of the vehicle. If desired, the cargo lid 28 can be secured in the open position with the latching assembly 35, as will be subsequently described.

Figure 5A:
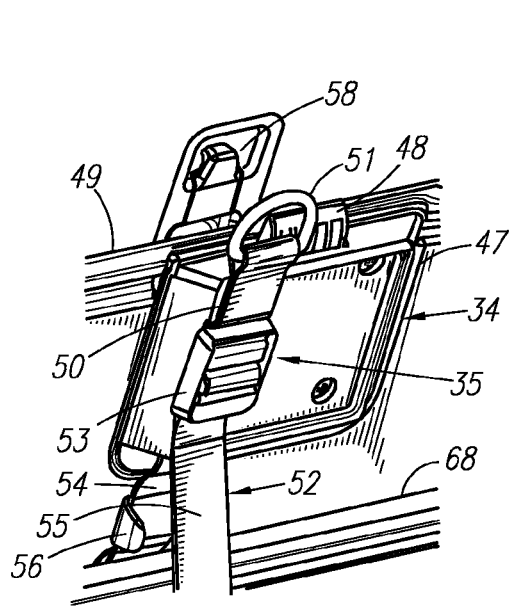
FIG. 5A is a close up view of a latching mechanism to secure the cargo lid in the closed position and a latching assembly to secure the cargo lid in the open position.

Referring to FIGS. 3 and 5A, the latching mechanism 34 includes a mounting frame 47 and a latch 48. The mounting frame 47 is secured to a front perimeter 49 of the lower portion 30 of the cargo lid 28. The mounting frame 47 may be connected to the lower portion 30 of the cargo lid 28 by any mechanical means known in the art such as but not limited to screws, rivets, an adhesive, etc. When the cargo lid 28 is in a closed position, as shown in FIG. 3, the latch 48 engages an opening (not shown) in a rear portion of the vehicle to thereby secure the cargo lid 28 in a closed position. The cargo lid 28, thus, serves as a floor for the rear portion of the vehicle.

Referring to FIGS. 1, 2, 4, and 5A, the latching assembly 35 includes a fixed upper strap 50 having a loop 51, an adjustable lower strap 52, and a buckle 53. The adjustable lower strap 52 includes a rear portion 54 fixedly attached to a rear surface of a cargo net mounting frame 68, described further below, and a front portion 55. The buckle 53 provides a connection between the fixed upper strap 50 and the adjustable lower strap 52. To secure the cargo lid 28 in an open position, as shown in FIG. 1, the cargo lid 28 is rotated to the open position and the latching assembly 35 is extended over the latching mechanism 34 such that the loop 51 is looped around a seat hook 58 located in a back portion of a rear seat 60. The user then pulls the front portion 55 of the adjustable lower strap 52 to tighten the latching assembly 35 to thereby tighten the cargo lid 28 against the rear seat 60.

Figure 5B:
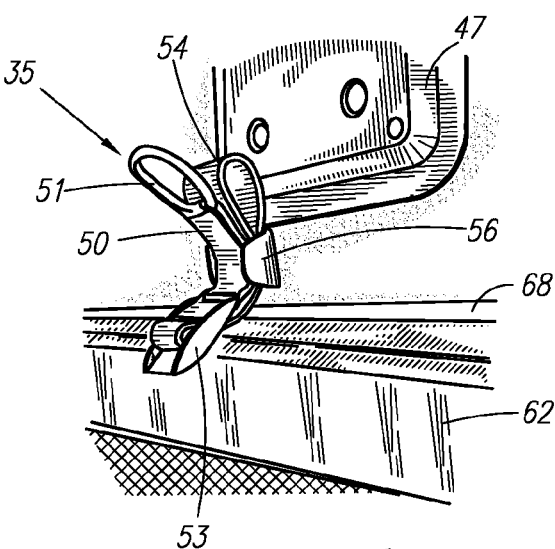
FIG. 5B is a close up view of the latching assembly secured in a strap holder when the latching assembly is not in use.

When the cargo lid 28 is in a closed position, as shown in FIG. 3, the latching assembly 35 is not is use. In this circumstance the latching assembly 35 is secured to a strap holder 56, as shown in FIG. 5B, so that the latching assembly 35 does not interfere with any other part of the cargo storage liner assembly 10. The strap holder 56 is attached to the rear portion 54 of the adjustable lower strap 52. The strap holder 56 can be attached to the rear portion 54 by any mechanical means known in the art, such as but not limited to, sewn with thread, rivets, etc.

Referring to FIGS. 4 and 6-9, the net assembly 16 attaches to the bottom surface 42 of the lower portion 30 of the cargo lid 28 and includes a cargo net 62, a rod 64, and a cargo net mounting assembly 66. The cargo net mounting assembly 66 has a rectangular cross section and includes a cargo net mounting frame 68 and a pair of end caps 70, only one shown. The cargo net mounting frame 68 has a rectangular cross section and includes a channel 72 that extends the length of the cargo net mounting frame 68.

Figure 9:
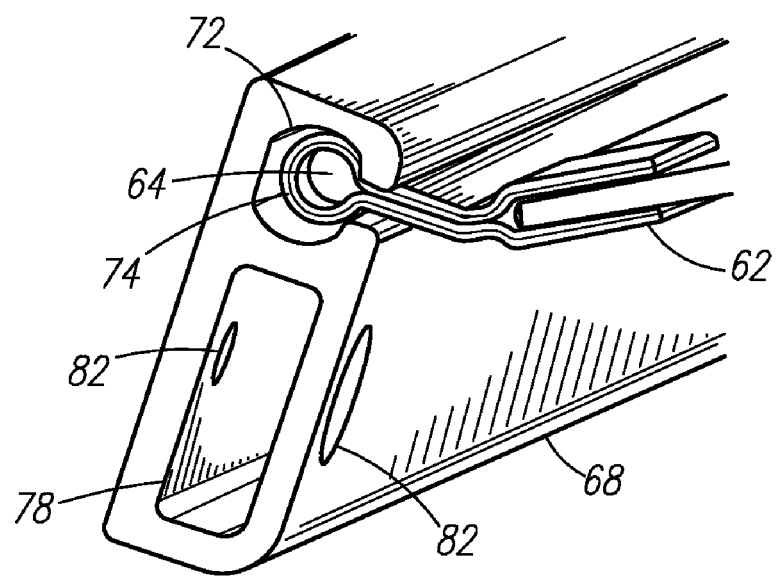
FIG. 9 is close up view of the cargo net inserted into the cargo net mounting assembly.

To mount the cargo net 62 to the cargo lid 28, the rod 64 is inserted into a loop portion 74 at the rear of the cargo net 62. The loop portion 74, which includes the rod 64, is inserted into one end of the channel 72 and both are slid the length of the channel 72 until the entire loop portion 74 and rod 64 are within the channel 72, as shown in FIG. 4. The rod 64 prevents the cargo net 62 from being pulled out of the channel 72 in a forward direction, as shown in FIG. 9. The end caps 70 are then attached to each end of the cargo net mounting frame 68 such that an end cap projection 76 is inserted into a rectangular shaped opening 78 located at each end of the cargo net mounting frame 68 so that a fastening hole 80 defined on the end cap projection 76 is aligned with two fastening holes 82 defined on a front and rear face of the cargo net mounting frame 68. The end caps 70 prevent the cargo net 62 from sliding sideways out of the channel 72 in the same manner that the cargo net 62 is inserted into the channel 72. Fastening means such as screws are then inserted through the fastening holes 80, 82 to thereby secure the cargo net mounting assembly 66 and the cargo net 62 to the cargo lid 28, as shown in FIG. 4. It should be noted that the cargo net 62 can be easily replaced by simply unsnapping the lid assembly 14 from the bin 12 to access the net assembly 16 or by unscrewing the cargo net mounting frame 68 from the cargo lid 28 to access the net assembly 16.

Figure 6:
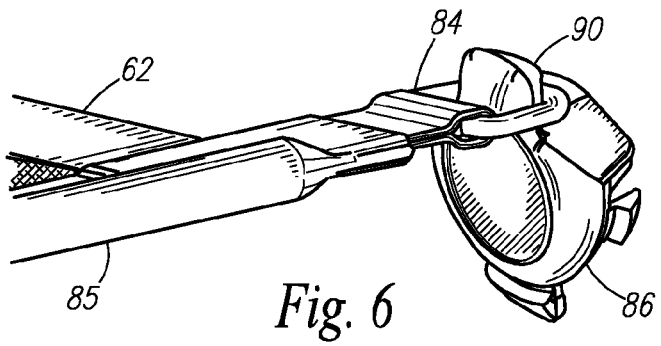
FIG. 6 is a close up perspective view of a cargo net mounting assembly.
Figure 7:
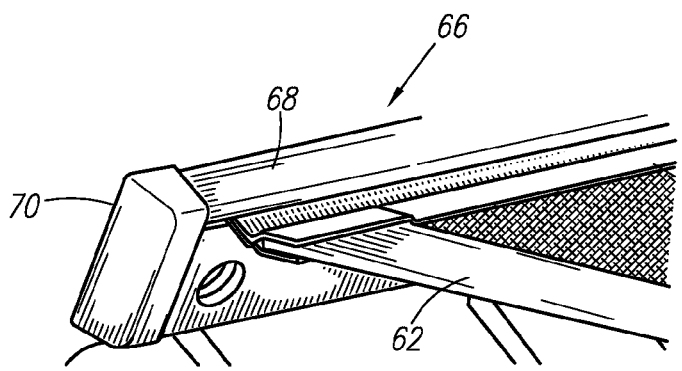
FIG. 7 is a close up exploded view of the cargo net mounting assembly.
Figure 8:
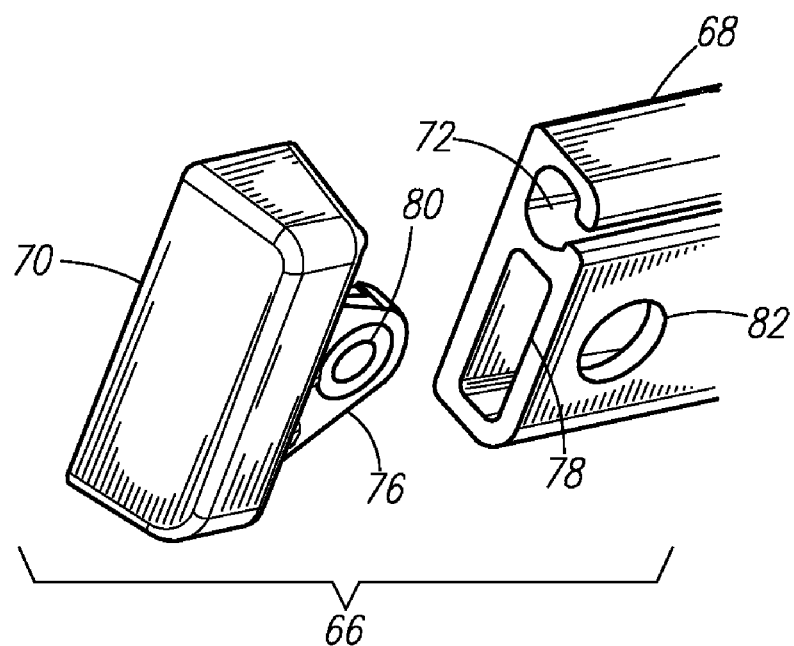
FIG. 8 shows an exploded view of the support frame and an end cap.

The cargo net 62 further includes a pair of side latching loops 84 located at a front portion 85 of the cargo net 62. The side latching loops 84 extend outward from the cargo net 62 in a sideways direction, as shown in FIG. 4. The side latching loops 84 attach to side wall hooks 86 located on each side wall 88 of the vehicle, as shown in FIGS. 1 and 6. Specifically, the side latching loops 84 hook over a hook portion 90 of each side wall hook 86 to thereby secure the cargo net 62 in a useable position. When the cargo net 62 is in a useable position the cargo net is generally parallel to the floor 24 of the bin 12. Thus, referring to FIG. 1, when the cargo lid 28 is secured in the open position described above the cargo net 62 can be secured in a useable position to increase the storage area behind the rear seat 60. Further, lighter more fragile items can be stored on the cargo net 62 and larger heavier items can be stored under the cargo net 62 to thereby prevent damage to the lighter more fragile items. Still further, items stored on the cargo net 62 are easily accessible from the rear seat 60 by a passenger while the passenger remains seated in the rear seat 60.

Referring to FIG. 2, FIG. 2 shows the cargo net 62 in a stored position. In the stored position the cargo net 62 is generally parallel with the cargo lid 28. Cargo net storage fasteners 92 are located on both the bottom surface 42 of the lower portion 30 of the cargo lid 28 and on a bottom edge 94 of the cargo net 62 near the side latching loops 84, as shown in FIG. 4. The storage fasteners 92 are mating type fasteners, such as but not limited to Velcro, snaps, buttons, etc. For example, if the storage fasteners 92 are Velcro then a Velcro piece is attached to the bottom surface 42 of the lower portion 30 of the cargo lid 28 and the mating portion of the Velcro piece is attached to the bottom edge 94 of the cargo net 62 near the side latching loops 84. In order to store the cargo net 62, the side latching loops 84 are removed from the side wall hooks 86 and the front of the cargo net 62 is lowered downward and the storage fasteners 92 are connected to each other to thereby secure the cargo net 62 in a stored position. When the cargo net 62 is in the stored position the cargo lid 28 can then be lowered to a closed position, as described above, whereby the cargo lid 28 serves as a floor for the rear portion of the vehicle, as shown in FIG. 3.

While specific embodiments of the invention have been described and illustrated, it is to be understood that these embodiments are provided by way of example only and that the invention is not to be construed as being limited but only by proper scope of the following claims.

What is claimed is:

1. A cargo liner storage assembly for an automotive vehicle comprising:
    a storage bin having a rear wall and hinge supports linearly spaced across a top of the rear wall;
    a cargo lid assembly having a cargo lid comprised of an upper portion and a lower portion, and multiple hinges linearly spaced across a rear perimeter of the lower portion; and
    a cargo net assembly removably attached to a bottom surface of the lower portion of the cargo lid,
    wherein the linear spacing of the hinge supports correspond with the linear spacing of the hinges,
    wherein the hinges include a receiving portion to receive the hinge supports by snapping the multiple hinges over the multiple hinge supports to thereby attach the cargo lid to the storage bin,
    wherein the cargo lid assembly can be removed from the storage bin by unsnapping the multiple hinges from the multiple hinge supports,
    wherein the cargo lid assembly further includes a latching assembly operatively attached to the bottom surface of the lower portion of the cargo lid, and
    wherein when the cargo lid is in an open position the latching assembly operatively attaches to a backside of a rear seat to thereby secure the cargo lid in the open position.

2. The cargo liner storage assembly of claim 1, wherein the multiple hinges further include a connecting portion operatively attached to the rear perimeter of the lower portion, wherein the receiving portion includes two arc-shaped arms integrated to the connecting portion, wherein the arc-shaped arms extend in an arc-like manner away from the connecting portion to thereby form a circular opening between the two arc-shaped arms, and wherein an elongated opening is formed between each end of the arc-shaped arms.

3. A cargo liner storage assembly for an automotive vehicle comprising:
    a storage bin having a rear wall and hinge supports linearly spaced across a top of the rear wall;
    a cargo lid assembly having a cargo lid comprised of an upper portion and a lower portion, and multiple hinges linearly spaced across a rear perimeter of the lower portion; and
    a cargo net assembly removably attached to a bottom surface of the lower portion of the cargo lid,
    wherein the linear spacing of the hinge supports correspond with the linear spacing of the hinges,
    wherein the hinges include a receiving portion to receive the hinge supports by snapping the multiple hinges over the multiple hinge supports to thereby attach the cargo lid to the storage bin,
    wherein the cargo lid assembly can be removed from the storage bin by unsnapping the multiple hinges from the multiple hinge supports,
    wherein the cargo lid assembly further includes a latching assembly operatively attached to the bottom surface of the lower portion of the cargo lid, and wherein when the cargo lid is in an open position the latching assembly operatively attaches to a backside of a rear seat to thereby secure the cargo lid in the open position,
    wherein the latching assembly includes a includes a fixed upper strap, an adjustable strap operatively attached to the bottom surface of the lower portion of the cargo lid, a buckle operatively connecting the fixed upper strap to the adjustable lower strap, and a strap holder, and wherein the strap holder receives and secures the latching assembly when the cargo lid is in a closed position.

4. The cargo liner storage assembly of claim 3, wherein the cargo lid assembly further includes a latching mechanism operatively attached to a front perimeter of the lower portion of the cargo lid, wherein the latching mechanism includes a mounting frame and a latch, and wherein when the cargo lid is in a closed position the latch engages an opening in a rear portion of the vehicle to thereby secure the cargo lid in a closed position.

5. The cargo liner storage assembly of claim 4, wherein when the cargo lid is in an open position the loop attaches to a seat hook located in a back portion of the rear seat, and wherein the buckle tightens the strap to thereby tighten the cargo lid against the rear seat.

6. A cargo liner storage assembly for an automotive vehicle comprising:
    a storage bin;
    a cargo lid assembly having a cargo lid comprised of an upper portion and a lower portion, the cargo lid being rotatably attached to the storage bin; and
    a cargo net assembly having a cargo net and a cargo net mounting assembly,
    wherein the cargo net mounting assembly is removably attached to a bottom surface of the lower portion and the cargo net is removably attached to the cargo net mounting assembly,
    wherein the cargo net includes a pair of side latching loops and a pair of storage fasteners located on a bottom surface of the cargo net near the side latching loops,
    wherein when the cargo net is in a useable position the side latching loops are attached to side wall hooks located on each side wall of the vehicle and the cargo net is generally parallel with a floor of the storage bin, and
    wherein when the cargo net is in a stored position the storage fasteners are attached to corresponding storage fasteners attached to a bottom surface of the lower portion of the cargo lid and the cargo net is generally parallel to the cargo lid.

7. The cargo liner storage assembly of claim 6, wherein the cargo net assembly further includes a rod, wherein the cargo net mounting assembly includes a mounting frame, wherein the mounting frame includes a channel that extends the length of the mounting frame, wherein the rod is inserted into a loop portion formed in a rear portion of the cargo net, and wherein the rod and loop portion are inserted into the channel until the entire rod and loop portion reside within the channel to thereby prevent the cargo net from being pulled out of the channel in a forward direction.

8. The cargo liner storage assembly of claim 7, wherein the cargo net mounting assembly further includes a pair of end caps, wherein the end caps are operatively attached to each end of the mounting frame after the rod and loop portion are inserted onto the channel to thereby prevent the cargo net from sliding out of the channel in the same manner that it was inserted into the channel, and wherein the mounting frame is removably mounted to the bottom surface of the lower portion of the cargo lid.

9. The cargo liner storage assembly of claim 8, wherein the storage bin includes a rear wall and hinge supports linearly spaced across a top of the rear wall, wherein the cargo lid assembly includes multiple hinges linearly spaced across a rear perimeter of the lower portion, wherein the linear spacing of the hinge supports correspond with the linear spacing of the hinges, wherein the hinges include a receiving portion to receive the hinge supports by snapping the multiple hinges over the multiple hinge supports to thereby attach the cargo lid to the storage bin, and wherein the cargo lid assembly can be removed from the storage bin by unsnapping the multiple hinges from the multiple hinge supports.

10. The cargo liner storage assembly of claim 9, wherein the cargo net can be replaced by either removing the mounting frame from the lower portion of the cargo lid and then removing the end caps from the mounting frame or by unsnapping the cargo lid assembly from the storage bin and removing the end caps from the mounting frame.

* * * * *